United States Patent [19]
Frosig et al.

[11] Patent Number: 6,091,479
[45] Date of Patent: Jul. 18, 2000

[54] SYSTEM FOR ALIGNING LENTICULAR IMAGES USING LINE SETS WITH DIFFERENT LINE COLORS

[75] Inventors: Peter A. Frosig; Wayne F. Niskala, both of Rochester; Roy Y. Taylor, Scottsville, all of N.Y.

[73] Assignee: Eastman Kodak Company, Rochester, N.Y.

[21] Appl. No.: 08/857,110

[22] Filed: May 15, 1997

[51] Int. Cl.[7] .................................................. G03B 27/32
[52] U.S. Cl. .............................................. 355/22; 355/77
[58] Field of Search .................................. 355/22, 33, 77; 359/20, 22, 626, 619; 348/42; 347/258; 358/488

[56] References Cited

U.S. PATENT DOCUMENTS

| | | | |
|---|---|---|---|
| 4,158,501 | 6/1979 | Smith et al. | 355/77 |
| 4,588,899 | 5/1986 | Erhardt | 250/491.1 |
| 5,408,294 | 4/1995 | Lam | 355/22 |
| 5,479,270 | 12/1995 | Taylor | 358/488 |
| 5,492,578 | 2/1996 | Morton | 156/64 |
| 5,519,794 | 5/1996 | Sandor et al. | 382/285 |
| 5,541,642 | 7/1996 | Ashbey | 348/59 |
| 5,633,719 | 5/1997 | Oehldeck et al. | 356/401 |
| 5,838,360 | 11/1998 | Harrold et al. | 347/258 |
| 5,940,531 | 8/1999 | Watanabe et al. | 382/165 |

Primary Examiner—Safet Metjahic
Assistant Examiner—Etienne P LeRoux
Attorney, Agent, or Firm—WilIam F. Noval

[57] ABSTRACT

Disclosed is a method and apparatus for aligning a lenticular image printed on a substrate with a lenticular lens sheet. The method comprises; fixing at least one set of differently colored alignment lines onto the substrate for projection through the lenticular lens sheet, positioning the lens sheet over the substrate, viewing at least one set of differently colored alignment lines as projected through the lens sheet, and adjusting the position of the lens sheet relative to the substrate according to a characteristic of the projected image.

18 Claims, 6 Drawing Sheets

SYSTEM FOR ALIGNING LENTICULAR IMAGES USING LINE SETS WITH DIFFERENT LINE COLORS

FIELD OF THE INVENTION

The invention relates generally to the field of lenticular images, and more specifically relates to a method and apparatus for aligning lenticular images with a lenticular lens sheet.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others. Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat No. 3,268,238 and U.S. Pat. No. 3,538,632, can be used to convey a number of individual two-dimensional scenes (such as unrelated scenes or a sequence of scenes depicting motion) rather than one or more three-dimensional images.

Integral image elements using reflective layers behind the actual integral image itself, to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186.

In a typical method of assembling a lenticular type of integral image element, an original negative is exposed from stored digitized data of a composite lenticular image on a film writer. A suitable film writer is the Symbolic Sciences International Fire 1000 and the LVT Model 1620B, available from Light Valve Technology, a subsidiary of Eastman Kodak Company, Rochester, N.Y. More recently lower-priced printers, such as the Kodak XLS8650 Thermal Printer have been adapted to write these interlaced files. A suitable negative exposure technique is disclosed in U.S. Pat. No. 5,276,478. After photographic processing, the negative is printed, typically by a projection enlarger or by contact printing, onto a suitable film- or paper-based photographic print stock. After processing, the lenticular composite print is coated with adhesive, aligned with a lenticular lens sheet, and pressed against the lens sheet to permanently adhere to it in proper registration with the printed lenticular composite image. Alternatively, the integral image can be printed by exposing using a number of original images at different positions, through the front side (that is the side bearing the lenticular lenses) of a lenticular lens sheet onto a suitable photosensitive medium.

While the width of each set of image lines may be less than or equal to the width of a lenticule, and each may be centered under its corresponding lenticule, these conditions are not essential. For example, U.S. Pat. No. 5,278,608 and U.S. Pat. No. 5,276,478 describe methods in which the image sets become increasingly spaced from the centers of their respective lenticules moving from the center to the edges of the integral image element. What is typically required is that all of the lines from only a single image can be clearly viewed from an intended (that is, preselected) viewing position in front of the lenticular lens sheet. For individual integral image elements or for short runs (that is, only a small number of copies) of integral image elements, this has been accomplished in the known art by first accurately measuring the pitch of the lenticular lens sheet to be used. The pitch is a measure of the size of the lenticular lens elements. The spacing of the sets of image lines in the print of the integral composite image would then be selected by a suitable magnification of the original integral image (whether optically or mechanically during printing from a negative, or electronically before printing an integral image in a computer memory). Following selection of the magnification, the print would then be printed directly onto a separate substrate (such as photographic film) with the resulting print then being aligned adjacent the back side of the lenticular lens sheet.

Since each of the lenses of a lenticular lens sheet is dedicated to a single image set of interleaved image lines, it is important that the lenticules be rotationally and translationally positioned with the image line sets, so that each set is parallel and aligned with a corresponding lenticule. Schemes for rotationally and translationally positioning a print with an overlay are disclosed in U.S. Pat. No. 5,479,270. In the method of U.S. Pat. No. 5,479,270 one or more, usually black or white alignment lines, are present on the substrate carrying the image. However, particularly when alignment is to be accomplished manually by a user using their eye as a guide, it is necessary in the method of U.S. Pat. No. 5,479,270 for a user to carefully observe the black and white Moire patterns generated between the alignment lines and the lenticular lens sheet, to determine when the alignment is correct.

It would be desirable then, to provide a means by which relatively accurate alignment of image lines with corresponding lenticules can be readily obtained, and which means allows relatively easy alignment even if performed repeatedly by eye.

SUMMARY OF THE INVENTION

The present invention provides a means which aids in alignment of an integral image (in particular a lenticular image), with a corresponding integral image lens sheet (in particular a lenticular lens sheet). Accordingly, the present invention provides, in one aspect, a method of aligning a lenticular image printed on a substrate, with a lenticular lens sheet. The method comprises:

(a) fixing at least one set of differently colored alignment lines onto the substrate; and (b) positioning the lens sheet over the substrate, viewing a projected image of the at least one set of differently colored alignment lines as projected through the lens sheet and adjusting the relative positions of the substrate and lens sheet if necessary in response to a characteristic of the projected image.

In another aspect, the present invention provides an apparatus which can execute the above method. The apparatus comprises:

(a) a lenticular image printed on a substrate which also carries at least one set of differently colored alignment lines fixed on the substrate for projection through the lenticular lens sheet;

(b) a lenticular lens sheet slidably positioned over the substrate to project the at least one set of alignment lines as a projected image; and (c) positioning means for adjusting the relative positions of the substrate and lens sheet in response to a characteristic of the projected image of the at least one set of differently colored alignment lines, to align the lenticular image with the lenticular lens sheet.

The present invention readily allows a user to align an integral image, particularly a lenticular image, with a correponding lens sheet, even if the alignment is performed by hand. Further, the present method optionally allows the center of a set of image lines to be relatively accurately aligned with the lenticular lens sheet.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

It will be appreciated that a conventional lenticular lens sheet is in the form of flat back side with a series of elongated, parallel, partially cylindrical lenses on the front side. However, a lenticular lens sheet could alternatively have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Further, by a lenticular image is referenced an image composed of interleaved from at least one complete image (and often more than one image), which lines are to be aligned with respective individual lenses so that each of the one or more images is viewable when a user's eyes are at the correct angle relative to the so formed imaging element. With regard to "colored" lines, these preferably would be other than black or white or gray, and further preferably have a chroma component so that they do not lie along the L* axis in a color system such as the CIE L*, a*, b*. CIE L*, a*, b* color space is discussed, for example, in "The Reproduction of Colour in Photography, Printing & Television", 4th Ed., by R. W. G. Hunt, Fountain Press, Tolworth, England, and including particularly pages 120–122. This reference and all others cited herein, are incorporated in this application by reference. Typically, each colored line will be of uniform color along its length.

It will also be appreciated that the methods of the present invention can be applied to integral images in general, including the lenticular images described above, as well as fly's eye images which are aligned with a fly's eye lens sheet. The integral images, and the lenticular images in particular, can exhibit a wide range of effects including motion, depth, flip, and other lenticular related effects.

It will be appreciated throughout this application, by a processor is referenced a suitable signal processor, such as a suitably programmed general purpose digital processor or hard wired equivalent circuitry.

Visual registration of the lenticular cover sheet to the interleaved thermal print by the operator enables on-site delivery of depth or motion prints for a waiting customer. This on-demand, one-off print delivery differs significantly from previous systems where image registration, processing and manipulation all are handled in a laboratory environment, or production area.

Figure 1:
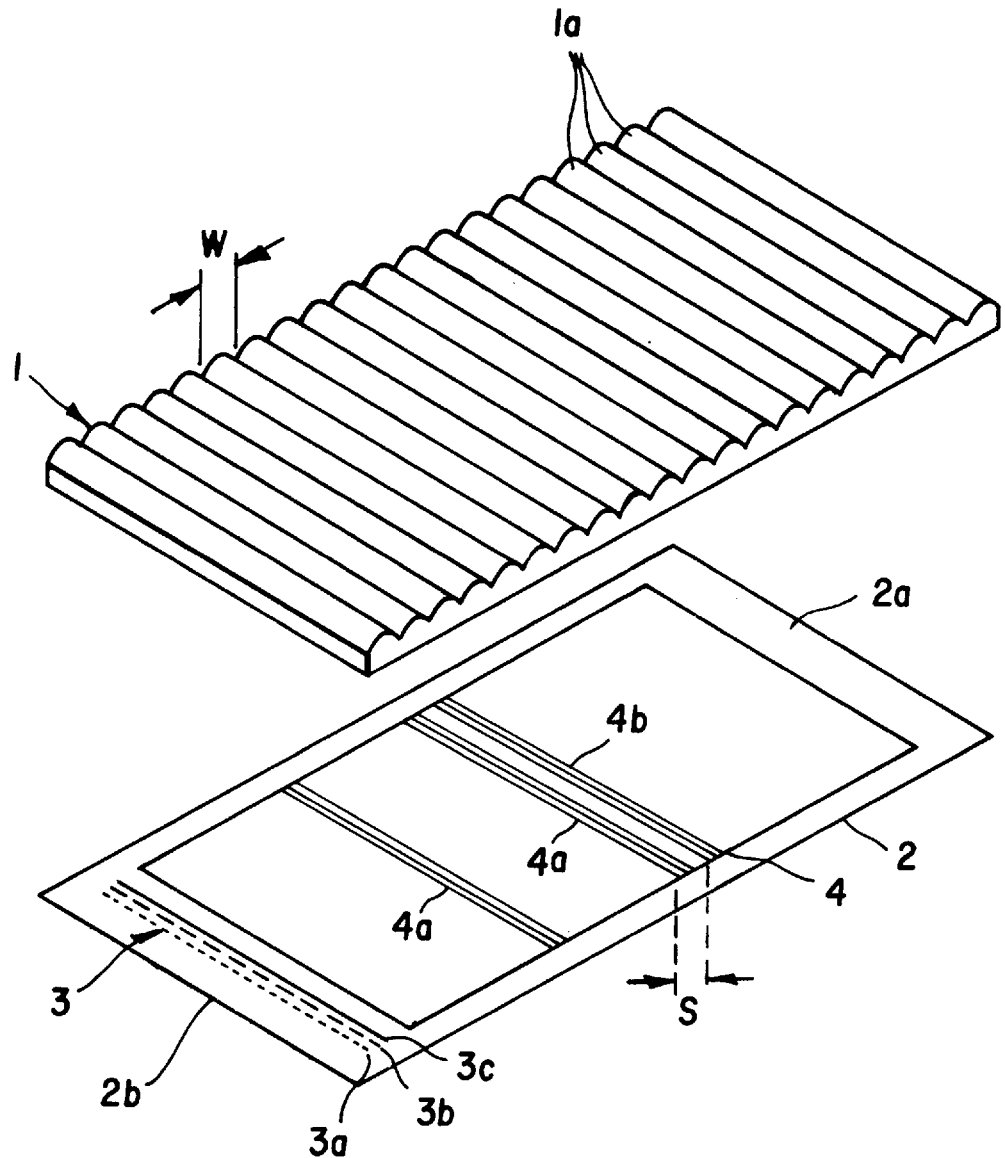
FIG. 1 is a perspective view which illustrates an alignment method and apparatus of the present invention.

Referring first to FIG. 1, a lenticular lens sheet 1 is shown in position over a substrate 2. Lens sheet 1 includes a plurality of elongated, parallel, adjacent partially cylindrical lenses referred to as lenticules 1$a$, having a pitch indicated by "W". Substrate 2 may be of a transparent material (such as a transparent plastic) or of a reflective material (such as white paper or a transparent material coated with a reflective material on a back side 2$b$). Substrate 2 carries a lenticular image 4 on a front side 2$a$. Lenticular image is composed of sets 4$a$ of parallel, interleaved lines, formed by interleaving lines from corresponding images in a known manner and as described above. A set 4$b$ is positioned centrally on the image 4 with the pitch of the sets being represented by "S". The pitch S is typically equal to the pitch of the lenticular lenses, W, although as mentioned above this need not be the case. Substrate 2 also carries a set 3 of differently colored lines 3$a$, 3$b$, 3$c$ which have been fixed to substrate 2 typically by the same printer used to print the lenticular image 4 on substrate 2. The set 3 of differently colored lines is parallel to each of the image line sets 4$a$.

Each of the lines of the set 3 preferably has a color which is selected from the printer's primary colors. By "primary colors" of the printer, is referenced the color generated from a single print source (such as a single thermal print head or laser) without mixing with colors from other print sources on the printer. This arrangement reduces mis-registration of colors in an alignment line which might otherwise result in a printer if the lines were formed from more than one primary color. Such mis-registration will cause color contamination in the projected Moire pattern. Thus, in a printer which can provide cyan, magenta, and yellow dyes (such as a thermal printer, or a laser printer printing onto a photographic element), line 3$a$ is cyan, line 3$b$ is magenta, and line 3$c$ is yellow, with line 3$b$ forming the middle of a pattern formed by the set 3. The colors are preferably "visually distinct". By this is referenced that their differences are visible to the human eye of normal sensitivity.

Figure 2A:
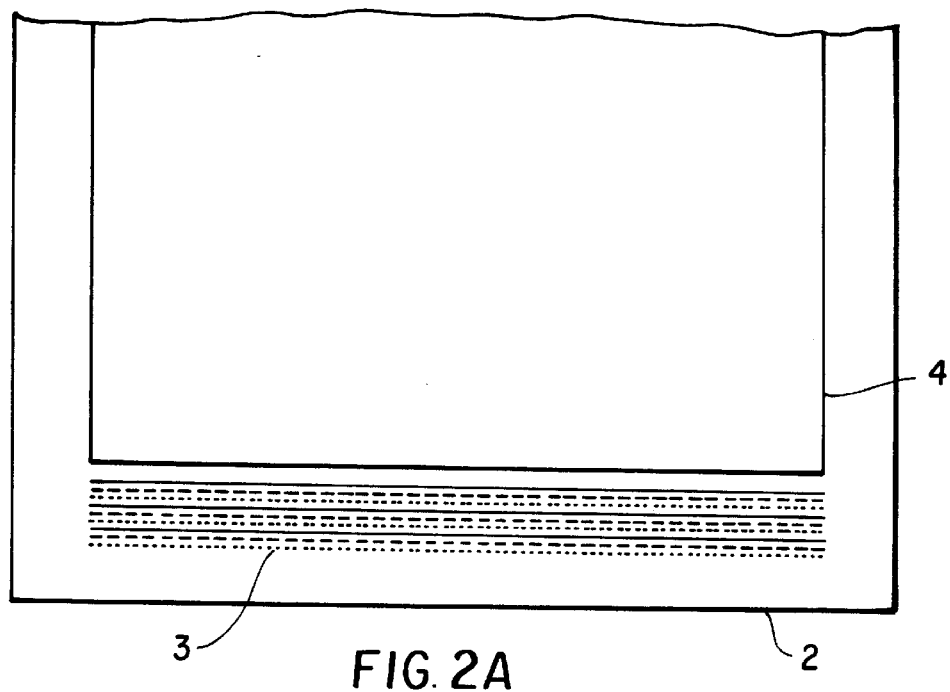
FIGS. 2A and 2B are a more detailed view of FIG. 1 particularly showing the arrangement of the alignment and image lines on a substrate.
Figure 2B:
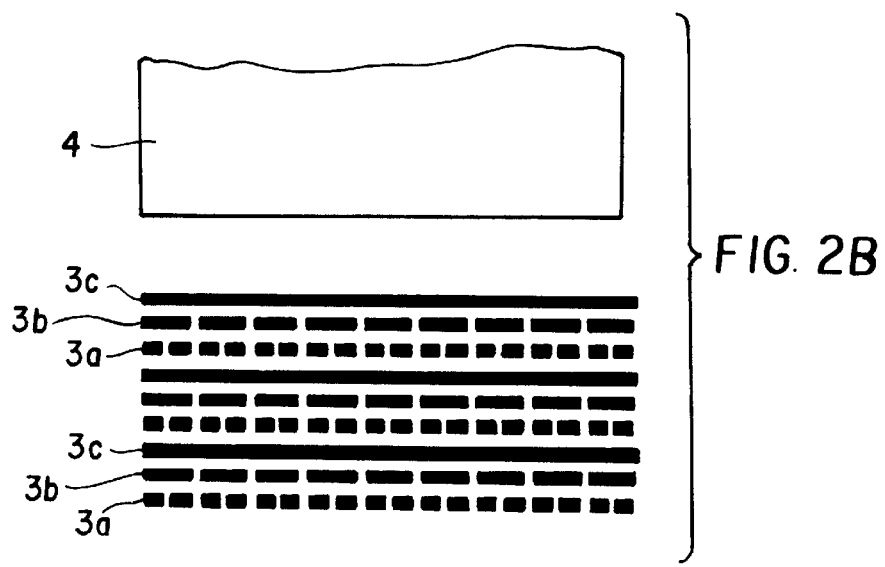

FIGS. 2A and 2B illustrate the arrangement of a plurality of alignment line sets 3 more closely, and their proximity to the lenticular image 4. The middle of the pattern (line 3$b$) resulting from alignment line set 3 is spaced from the middle of the lenticular image (defined by the middle line in middle set 4$b$) by an integral multiple of the lenticular lens pitch, W, or of the pitch of the lenticular image, S. In the typical case illustrated in the drawings W equals S although, as discussed above, they need not be equal. More than one alignment line set can be present, as seen in FIGS. 2A and 2B with the total width of all alignment line sets being, for example, about 0.10 inch and of the same length as the image line sets 4a.

To correctly angularly align the lenticular image 4 with the lenticular lens sheet 1, the relative angular positions of lens sheet 1 and lenticular image 4 can be adjusted by slidably rotating one with respect to the other. This can be accomplished by a suitable motor (not shown). The alignment line sets 3 as projected through the lenticules 1a can then be viewed either by a user's eye, or by one or more suitable sensors, and a characteristic of the projected image of the alignment line sets 3 observed. The characteristic used can be any one or more of the characteristics described in U.S. Pat. No. 5,479,270 each of which can be used for one or each of the different colors observed in the patterns formed from each set 3. U.S. Pat. No. 5,479,270 and other references cited in this application, are incorporated herein by reference. One example is the observation of the formed Moire patterns from alignment line sets 3 as projected through lenticules 1a. This is shown in FIGS. 3A, 3B, 3C.

Figure 3A:
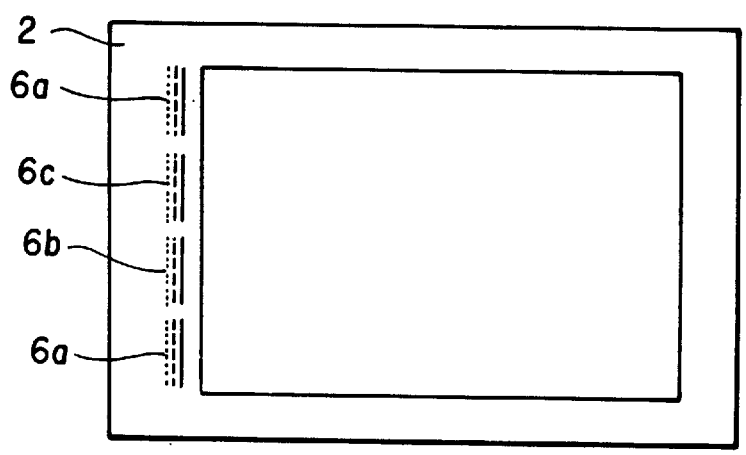
FIGS. 3A, 3B and 3C illustrate the Moire patterns projected through the lenticular lens sheet of FIG. 1 as the lens sheet and lenticular image are brought into alignment.
Figure 3B:
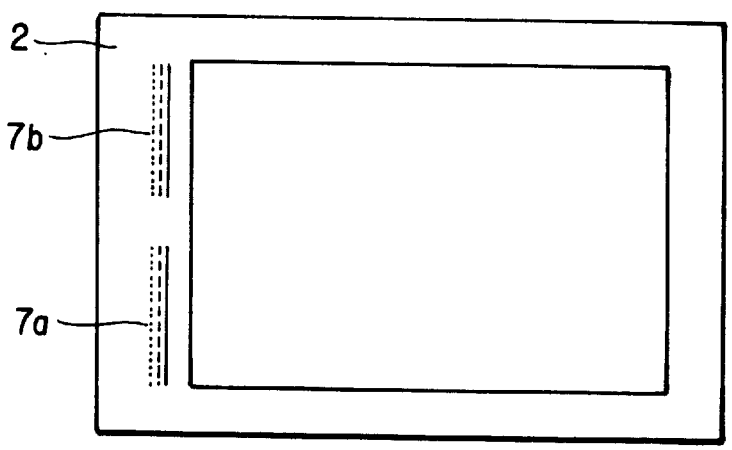
Figure 3C:
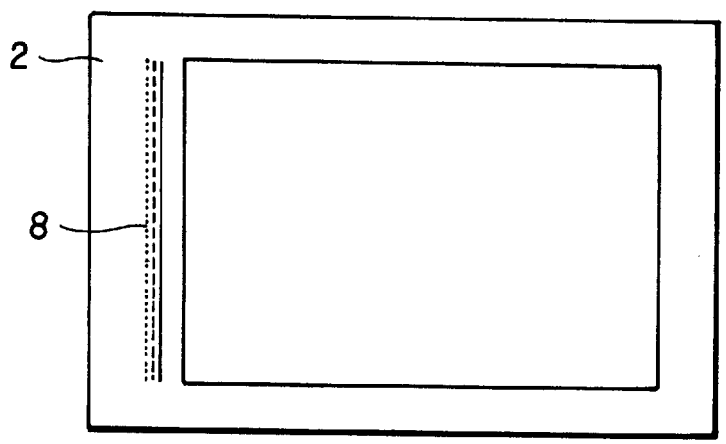

Referring to FIGS. 3A to 3C, there is shown the alignment line sets 3 as projected through lenticules 1a as the lenticular image 4 progresses from being out of angular alignment (FIG. 3A) to correct angular alignment (FIG. 3C). Considering first FIG. 3A, where there is significant misalignment between the lenticular image 4 and lens sheet 1 (and hence misalignment between alignment line sets 3 and lens sheet 1), a Moire pattern of regions of alternating colors 6a, 6b, 6c will be projected through lenticules 1a. The color of each region will correspond to a color of one of the lines 3a, 3b, 3c. The greater the degree of misalignment, the greater the number of alternating different colored regions will be seen. As seen in FIGS. 3A to 3C, as the lenticular lens sheet 1 is rotated in relation to the image 4, the moiré pattern seen at a given viewing location is diminished as alignment improves. In FIG. 3B, with somewhat improved alignment over that of FIG. 3A, only two different colored regions 7a and 7b will be seen simultaneously from the same viewing position. FIG. 3C shows a representation where only a single field of color 8, could be seen at a given angle through the lenticules, indicating the correct angular alignment of lenticular cover sheet and interleaved image. When image 4 is correctly translationally aligned with the lens sheet 1, the single color 8 will, in the particular arrangement of FIGS. 1 to 4, be magenta when the alignment line sets 3 are viewed by a user or a sensor perpendicular to lens sheet 1. If another color 8 is not magenta, the lens sheet 1 or substrate 2 can be moved sideways relative to the other until color 8 is magenta.

Figure 4:
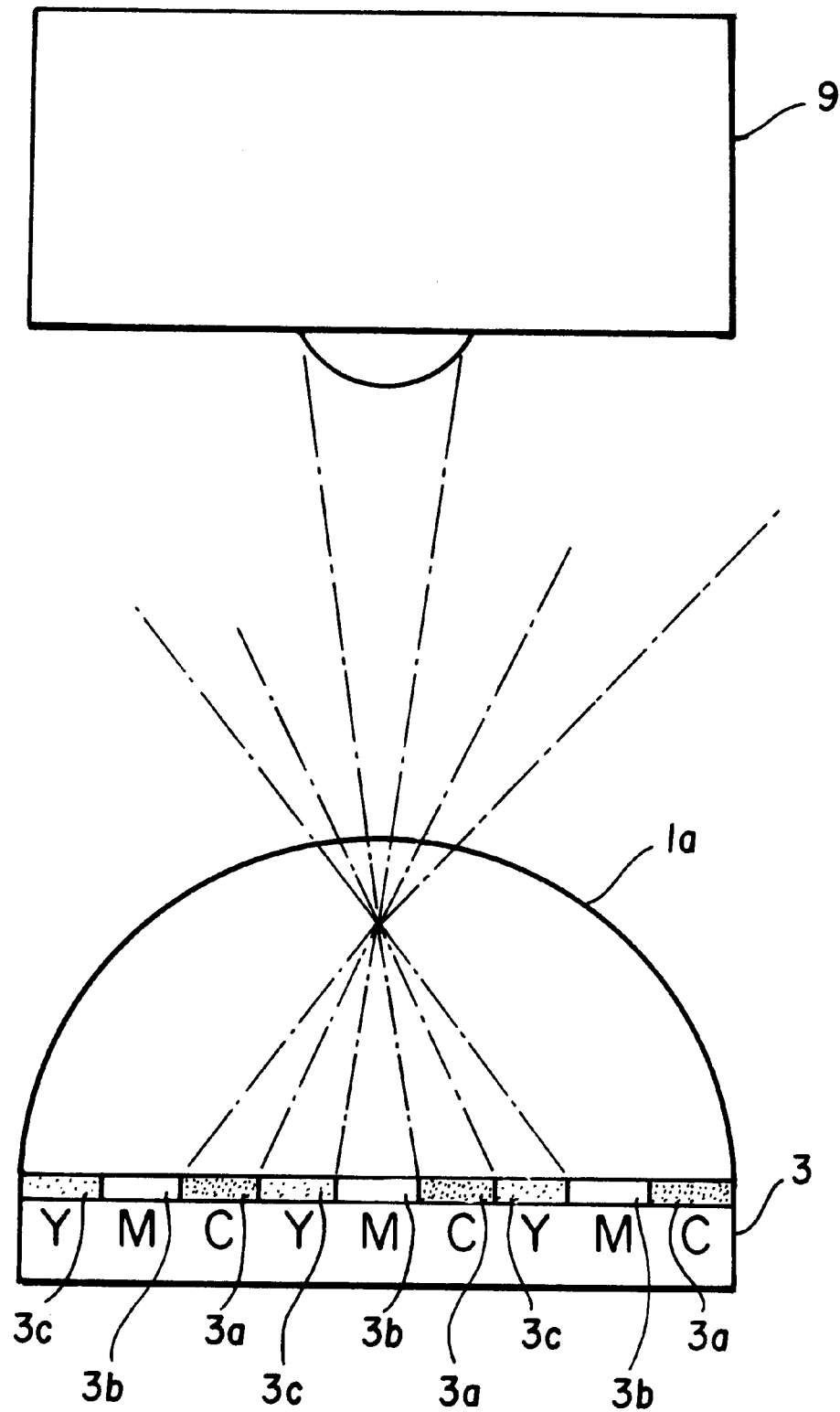
FIG. 4 is a lateral cross-section showing a single lenticular lens and another arrangement of a corresponding set of colored lines as used in the present invention.

FIG. 4 illustrates a lateral cross section of a single lenticule 1a of lenticular lens sheet 1 and substrate 2, and the underlying color lines of multiple alignment line sets 3 which project through a single lenticule 1a. The operator or an image sensor, 9, can detect any of the mullet-colored interleaved lines depending on their viewing angle with respect to the lenticular lens sheet 1. In this illustration, if the operator, or sensor 9 was located perpendicular to the lenticule 1a, a solid field of magenta would indicate that the image was both correctly angularly and translationally aligned with the lenticular image 4.

Figure 5:
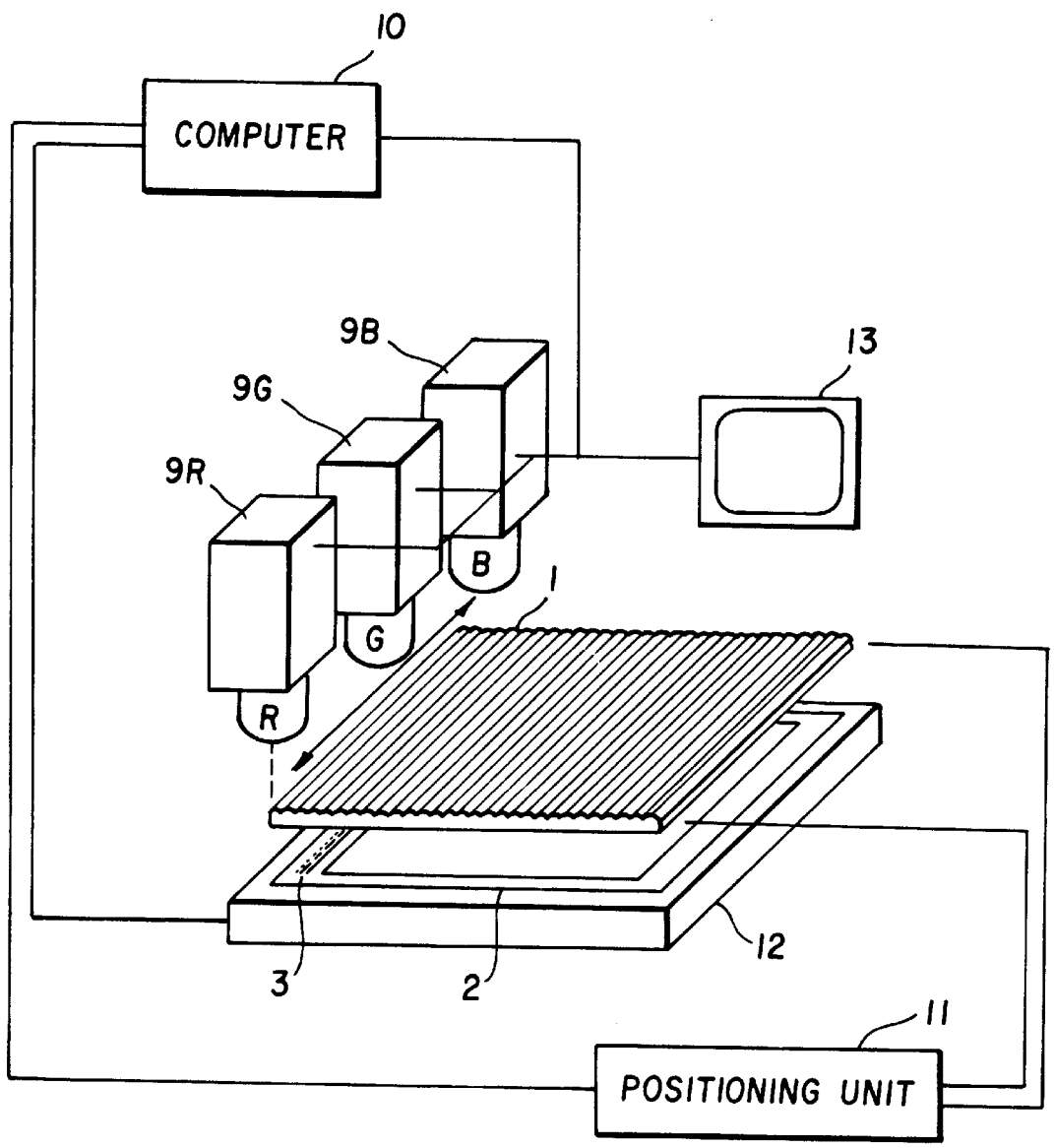
FIG. 5 illustrates another apparatus of the present invention which can automatically align a lenticular lens sheet and lenticular image.

FIG. 5 illustrates an automated apparatus which can execute the method of aligning the lenticular lens sheet 1 and the lenticular image 4. Substrate 2 is held in position by a vacuum platen 12 which may be activated by a processor 10 when a suitable detection means (not shown) indicates to processor 10 that a substrate 2 is present in platen 12. An alignment line set 3, located along one edge of the substrate 2, is seen by three optical sensors 9R, 9G, 9B. In this instance one sensor 9G is filtered to detect a magenta color only, sensor 9R is filtered to detect a cyan color only, and sensor 9B filtered to detect a yellow color only. The sensors scan or can view the full length of the alignment line set 3 as projected through the lenticular lens sheet 1. In this instance, a processor 10 receives signals (such as a peak signal) from along the length of the projected image of the set 3, from sensors 9R, 9G, and 9B. Processor 10 will control positioning unit 11 to move lens sheet 1 relative to substrate 2, until a peak magenta signal is obtained which indicates correct angular and translation alignment. The computer monitor 13, allows calibration of the system and observation by a user of the projected image of set 3 as viewed by sensors 9R, 9G and 9B. Following correct alignment of the lenticular lens sheet 1 and lenticular image 4, the two are then preferably bonded using a suitable fastening means such as an adhesive (for example Eastman AQ29 adhesive available from Eastman Chemical, Tennessee, USA) or heat sealing.

Figure 6:
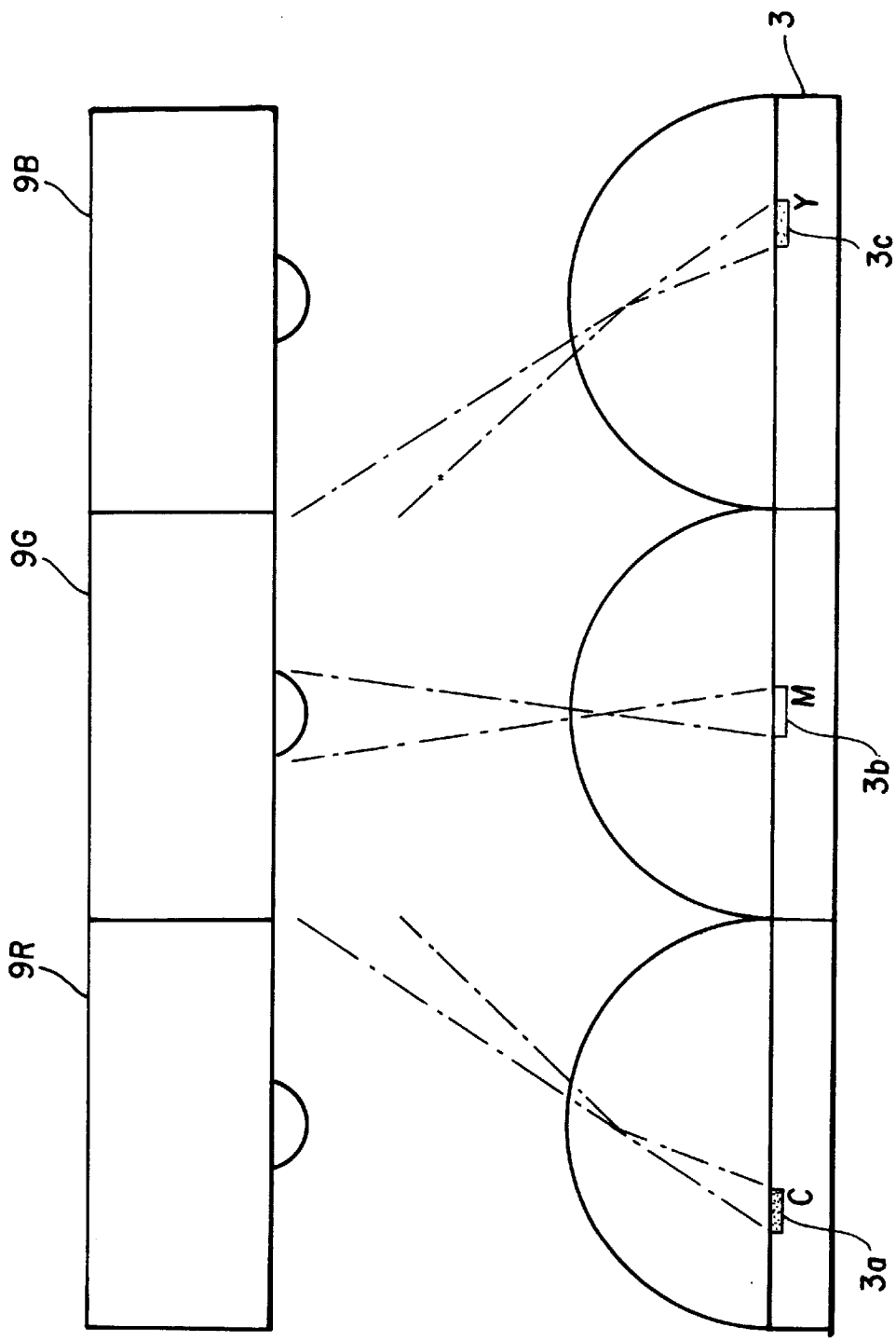
FIG. 6 is a lateral cross-section of a lenticular lens sheet showing an alternate arrangement of a set of alignment lines as used in the present invention.

FIG. 6 is a lateral cross-section similar to FIG. 4 but illustrating an alternate arrangement of alignment lines of a set 3. In the arrangement of FIG. 6, each differently colored line of the set is associated with a corresponding, different lenticule. Notice in this arrangement that the center of the pattern projected by the set 3, is still magenta line 3b, and that like FIG. 4 the cyan and yellow lines 3a, 3c are not centered beneath a lenticule 1a when the magenta line 3b of the same set 3 is so centered. In particular, in FIG. 6 a magenta line 3b is arranged to be centered beneath its corresponding lenticule 1a, while cyan line 3a and yellow line 3c are off-center with respect to their corresponding lenticules. This arrangement causes only sensor 9G to see an alignment line when lenticular image 4 is correctly translationally aligned with lens sheet 1. If however, sensor 9R generates a signal, this indicates the lenticular lens sheet 1 must be shifted to the right as viewed in FIG. 6, to obtain correct lateral alignment of the lenticular image 4 with lens sheet 1. If however, sensor 9B generates a signal, this indicates the lenticular lens sheet 1 must be shifted to the left as viewed in FIG. 6, to obtain correct lateral alignment of the lenticular image 4 with lens sheet 1.

It will be appreciated that while it is preferred to have at least three differently colored lines in an alignment line set, it is possible to fix as little as two differently colored alignment lines onto the substrate. An alignment line set can have more than 3 differently colored lines, and ideally has the same number of different colored lines as the actual number of lines in an image line set 4a. Such an arrangement would further aid in correct translation alignment of lenticular image 4 with lenticular lens sheet 1.

The invention has been described in detail with particular reference to certain preferred embodiments thereof, but it will be understood that variations and modifications can be effected within the spirit and scope of the invention.

PARTS LIST

| | |
|---|---|
| 1 | lens sheet |
| 1a | lenticules |
| 2 | substrate |
| 2a | substrate front side |
| 2b | substrate back side |
| 3 | alignment line sets |

-continued

PARTS LIST

| | |
|---|---|
| 3a | colored line (cyan) |
| 3b | colored line (magenta) |
| 3c | colored line (yellow) |
| 4 | lenticular image |
| 4a | set of parallel, interleaved lines |
| 4b | middle set of parallel, interleaved lines |
| 6a, 6b, 6c | different color regions |
| 7a, 7b | different color regions |
| 8 | single field of color |
| 9 | image sensor |
| 9B | optical sensors |
| 9G | optical sensors |
| 9R | optical sensors |
| 10 | processor |
| 11 | positioning unit |
| 12 | vacuum platen |
| 13 | computer monitor |

What is claimed is:

1. A method of aligning a lenticular image printed on a substrate, with a lenticular lens sheet adjustably positioned adjacent to said substrate comprising;

(a) fixing at least one set of differently colored alignment lines having at least one line of predetermined color onto the substrate for projection through the lenticular lens sheets; and (b) positioning the lens sheet over the substrate;

(c) sensing a projected image of the at least one set of differently colored alignment lines as projected through the lens sheet; and (d) translationally adjusting said substrate and lens sheet, if necessary such that translational alignment is achieved when said line of predetermined color is viewed sensed.

2. A method according to claim 1 wherein the different colored lines of the set are spaced to project through respective, different lenticules.

3. A method according to claim 1 wherein the different colored lines of the set are so spaced that they project through a single corresponding lenticule.

4. A method according to claim 1 wherein the middle of the pattern resulting from fixing a set is spaced from the middle of the lenticular image by an integral multiple of the lenticular lens pitch or of the pitch of the lenticular image.

5. A method according to claim 1 wherein the middle of the pattern resulting from fixing a set is spaced from the middle of the lenticular image by an integral multiple of the lenticular lens pitch, and additionally comprising attaching the lens sheet to the substrate when the middle of the pattern is aligned beneath the middle of a lenticule.

6. A method according to claim 1 wherein the at least one set comprises at least three differently colored lines.

7. A method according to claim 1 wherein the differently colored alignment lines are fixed onto a substrate by a printer and have colors selected from the printer's primary colors.

8. A method according to claim 2 wherein multiple sets of the alignment lines are provided for projection through respective lenticules.

9. A method according to claim 1 wherein each set of alignment lines is printed in parallel to the interleaved lines forming the lenticular image.

10. An apparatus comprising:

(a) a lenticular image printed on a substrate which also carries at least one set of differently colored alignment lines having at least one line of predetermined color fixed on the substrate;

(b) a lenticular lens sheet slidably positioned over the substrate to project the at least one set of alignment lines as a projected image; and (c) positioning means for translationally adjusting said substrate and said lens sheet such that translational alignment is achieved when said line of predetermined color is sensed.

11. An apparatus according to claim 10 wherein the different colored lines of the set are spaced to project through respective, different lenticules.

12. A method according to claim 10 wherein the different colored lines of the set are so spaced that they project through a single corresponding lenticule.

13. An apparatus according to claim 10 wherein the positioning means includes a plurality of sensors, each responsive to only a corresponding color of one of the alignment lines.

14. An apparatus according to claim 10 wherein the middle of a pattern resulting from the fixed a set of alignment lines, is spaced from the middle of the lenticular image by an integral multiple of the lenticular lens pitch or of the pitch of the lenticular image.

15. An apparatus according to claim 10 wherein the middle of a pattern resulting from the fixed set of alignment lines, is spaced from the middle of the lenticular image by an integral multiple of the lenticular lens pitch.

16. An apparatus according to claim 11 additionally comprising a means for attaching the lens sheet to the substrate at a position at which the alignment line set is aligned beneath a lenticule.

17. An apparatus according to claim 10 wherein the at least one set comprises at least three differently colored lines.

18. An apparatus according to claim 10 wherein the differently colored alignment lines were fixed onto a substrate by a printer and have colors selected from the printer's primary colors.

* * * * *